(12) United States Patent
Olberg et al.

(10) Patent No.: US 9,757,877 B2
(45) Date of Patent: Sep. 12, 2017

(54) HYDRAULIC COMPOSITES SEPARATOR

(71) Applicant: The Boeing Company, Chicago, IL (US)

(72) Inventors: Jeffrey Hayden Olberg, Federal Way, WA (US); Mike Moodi, Bothell, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 14/537,041

(22) Filed: Nov. 10, 2014

(65) Prior Publication Data

US 2016/0129611 A1 May 12, 2016

(51) Int. Cl.
*B25B 11/00* (2006.01)
*B29C 33/48* (2006.01)
*B29C 70/00* (2006.01)

(52) U.S. Cl.
CPC ............ *B29C 33/485* (2013.01); *B29C 70/00* (2013.01)

(58) Field of Classification Search
CPC .... B25B 1/00; B25B 3/00; B25B 5/00; B25B 7/00
See application file for complete search history.

(56) References Cited

U.S. PATENT DOCUMENTS

| | | | | |
|---|---|---|---|---|
| 2,754,708 | A * | 7/1956 | Peterson | B25B 1/2421 269/224 |
| 4,572,564 | A * | 2/1986 | Cipolla | B25B 1/2421 269/266 |
| 4,934,674 | A * | 6/1990 | Bernstein | B25B 1/103 269/136 |
| 5,806,841 | A * | 9/1998 | Hebener | B23B 31/265 269/157 |
| 6,953,188 | B2 * | 10/2005 | Siegel | B25B 1/08 269/254 CS |
| 2016/0129611 | A1 * | 5/2016 | Olberg | B29C 70/00 29/426.5 |

OTHER PUBLICATIONS

Brickner, Mike et al., "Independent Research: Composite Spar Manufcaturing", Report written Mar. 25, 2011.
Black, Sara, "New Options for Trapped Tooling", Composites World, Posted on Jul. 1, 2011.

* cited by examiner

*Primary Examiner* — Lee D Wilson
(74) *Attorney, Agent, or Firm* — McDonnell Boehnen Hulbert & Berghoff LLP

(57) ABSTRACT

A method and apparatus for applying a force to an assembly comprising a layup mandrel and a composite part. The apparatus comprises a first gripper and a second gripper. The second gripper is spaced apart from the first gripper so as to define a space between the first and second grippers, the space configured to receive the assembly. An actuation system is positioned between the first and second grippers adjacent the space, the actuation system configured to separate the layup mandrel from the composite part by applying force.

20 Claims, 4 Drawing Sheets

HYDRAULIC COMPOSITES SEPARATOR

TECHNICAL FIELD

The present disclosure relates generally to apparatus and methods for manufacturing composite parts. Specifically, the present disclosure relates to apparatus and methods for separating a composite part from a layup mandrel.

BACKGROUND

Shaped laminated composite parts may be laid up ply-by-ply on a tool referred to as a layup mandrel. Typically, the layup mandrel comprises a tool surface substantially matching the part and functioning to shape the plies as they are laid up and compacted on the mandrel. The laid up plies along with the layup mandrel may then be placed in an autoclave thereby subjecting the laid plies to increased temperature and increased pressure. When laying up a composite part, a composite material is positioned around and/or through a layup mandrel. After the part is formed, the composite part is removed from the layup mandrel so that the layup mandrel can be used to form the next composite part. However, in some cases, after undergoing the compaction and cure cycle, the composite part can be difficult to remove from the layup mandrel. As just one example, for the production of stringers having two layup parts or layup sections, one layup section might be removed while the other layup section remains on the layup mandrel. Since these stingers oftentimes are quite lengthy and they have a tendency to adhere to the layup mandrel post cure, the remaining layup section can take many man hours and labor to remove. Sometimes, it may take hours to even remove one section of the layup mandrel.

Currently, human strength is used to pull the layup mandrels from the composite part. This can oftentimes use over 1000 pounds of force to separate the parts. In some instances, it may take up to sixteen hours to separate the layup mandrel from the composite part. Another proposed solution is to attempt to clamp the assemblies (the composite part with the layup mandrel) to a table and use boards, pipes, etc. in an attempt to pry the layup mandrel from the composite part. However, the clamps and assembly store energy from the clamping force, which causes the clamps to be forced off of the assembly.

SUMMARY

According to an exemplary embodiment, an apparatus for applying a force to an assembly comprises a layup mandrel and a composite part. The apparatus comprising a first gripper and a second gripper. The second gripper is spaced apart from the first gripper to define a space between the first and second grippers, the space configured to receive the assembly. An actuation system is positioned between the first and second grippers adjacent the space, the actuation system configured to separate the layup mandrel from the composite part by applying force.

In another arrangement, a method of separating a layup mandrel from a composite part is provided. The method comprising the steps of constraining the composite part in a stationary position; coupling an actuator to the layup mandrel; and applying force to a transfer block. The actuator comprises a piston which moves in a first direction to contact the transfer block, whereby the layup mandrel is caused to move in a second, opposite direction away from the composite part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The herein-described apparatus and method allows for quick and efficient removal of a composite part from a layup mandrel, without damaging the composite part where such a composite part may comprise an I-beam, a T-beam or other like composite structure. More specifically, this disclosure relates to apparatus and methods for applying force to an assembly that includes a layup mandrel and a composite part in order to separate the layup mandrel from the composite part. The layup mandrel typically comprises two layup mandrel parts, which are pulled away from the composite part after the composite part has been processed (e.g., laid up and cured typically by way of increased pressure and heat). The apparatus is configured to constrain the composite part in a stationary position such that a force placed upon the layup mandrel will allow these two components to be driven apart and therefore separated.

As just one example, the layup mandrel and the composite part may be secured to a stationary platform or work surface such as a table. In use, and in one arrangement, at least a first gripper and a second gripper are removably positioned on the stationary platform or work surface so that a bearing surface of the first gripper and a bearing surface of the second gripper contact the composite part and secure the composite part in a set position. Once the composite part is placed in this secured position by way of the first and second grippers, one or more actuators are activated or energized so as to extract and therefore drive the layup mandrel parts one at a time or simultaneously away from the stationary composite part.

The apparatus may be used for a variety of different layup mandrels and composite part configurations. For example, in one separator apparatus arrangement, the composite part may comprise curved corners. In other arrangements, the composite part may comprise an I-beam stringer or a T-beam stringer. Different amounts of force may be used to separate the layup mandrel and composite part wherein such force depends on the layup mandrel and composite part. For example, when the separator apparatus of the present disclosure utilizes a hydraulic actuator as a component of the actuator system, up to 1150 pounds of force may be applied to separate the composite part from the layup mandrel.

Figure 1:
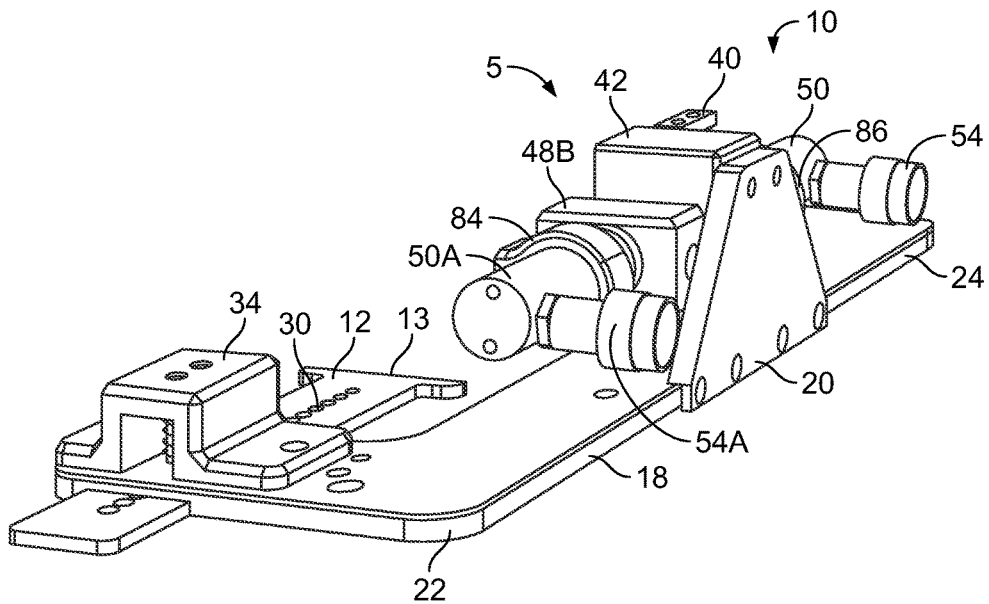
FIG. 1 is an illustration of a perspective view of an apparatus for applying a force to an assembly comprising a layup mandrel and a composite part in order to separate the layup mandrel from the composite part.
Figure 2:
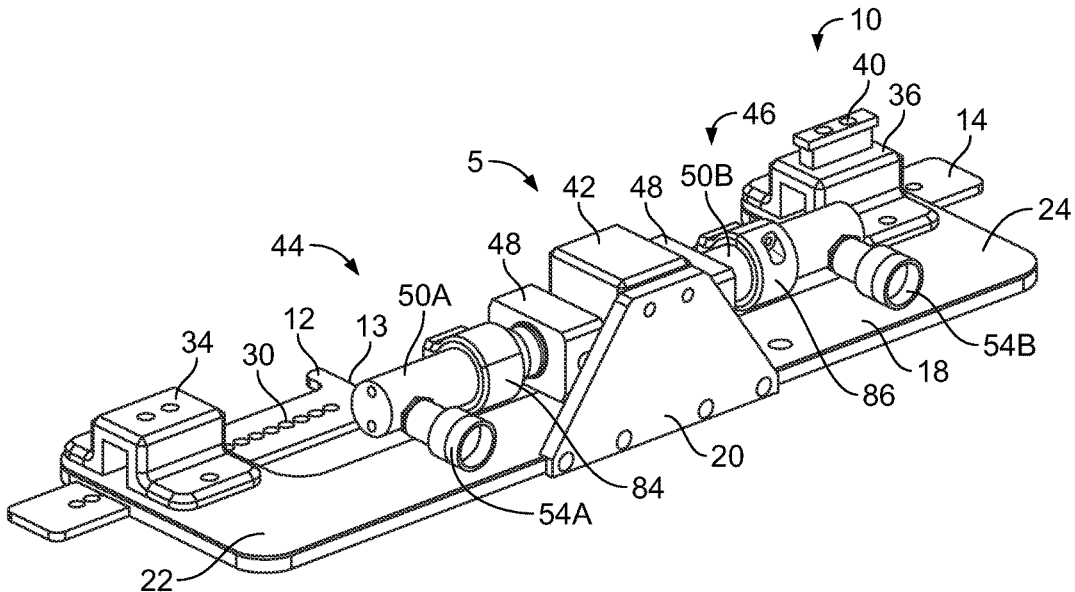
FIG. 2 is an illustration of another perspective view of the apparatus of FIG. 1.
Figure 3:
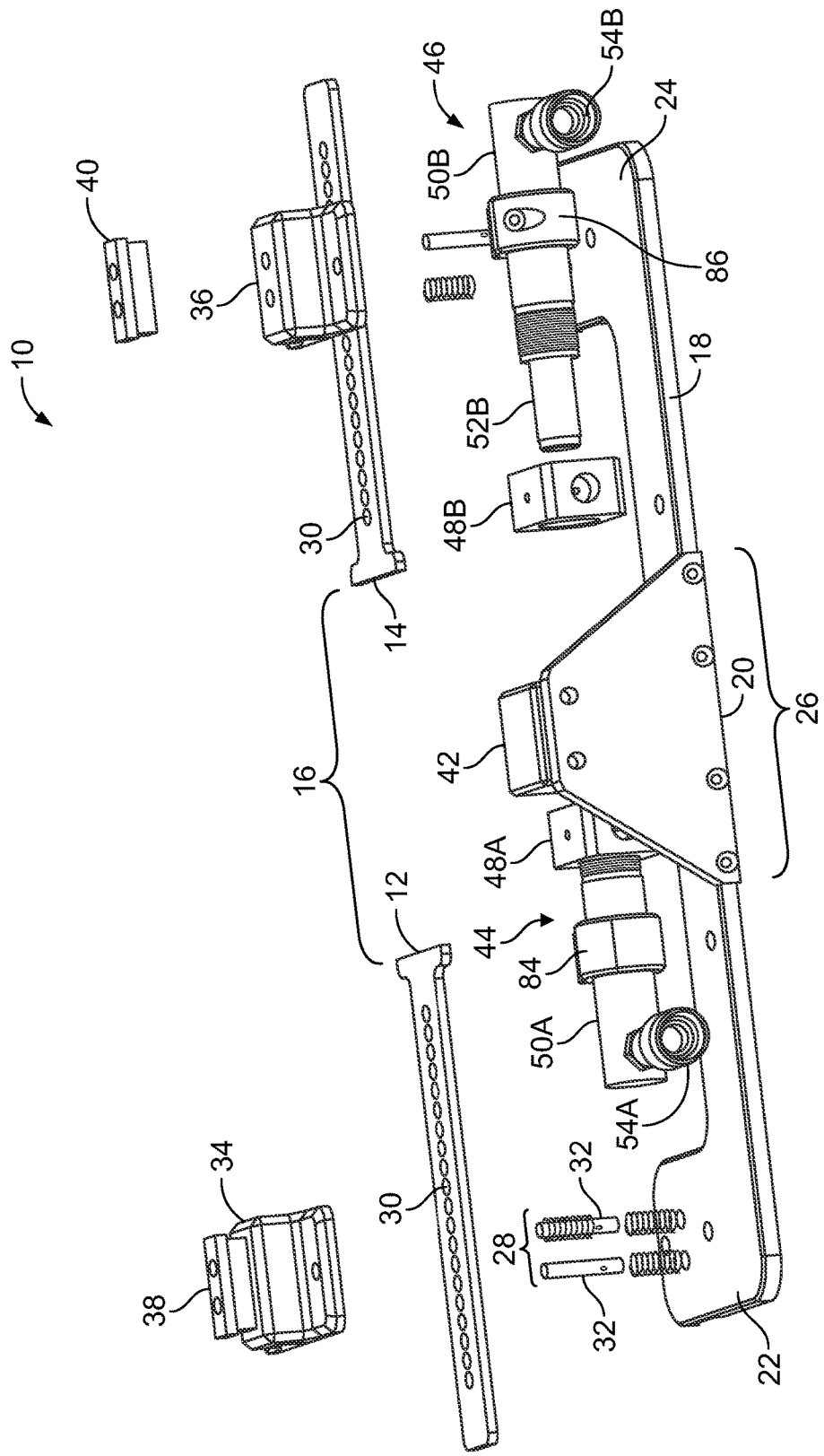
FIG. 3 is an illustration of an exploded view of the apparatus of FIG. 1.

Referring more particularly to the drawings, FIG. 1 illustrates a first perspective view of a separating apparatus 10 for applying a force to an assembly where the assembly comprises a layup mandrel and a composite part. As will be discussed herein in greater detail, such a layup mandrel may comprise a single layup part or may comprise a mandrel comprising a first layup part and a second layup part. FIG. 2 illustrates a second perspective view of the separating apparatus 10 illustrated in FIG. 1. FIG. 3 is an illustration of an exploded view of the separating apparatus 10.

Referring now to FIGS. 1-3, the separating apparatus 10 comprises a first gripper 12, a second gripper 14, and an actuation system 5. As will be described in greater detail below, the first and second grippers 12, 14 are positioned so as to contact a stringer flange of a composite part so as to keep this composite part stationary during a separation procedure. A bearing surface 15 of the second gripper 14 is spaced from a bearing surface 13 of the first gripper 12 so as to define a variable space 16 between the first and second grippers 12, 14. It is within this variable space 16 that the composite part will be secured. The separating apparatus 10 further comprises a substantially planar base plate 18 and a truss 20, wherein the truss 20 is coupled to the base plate 18. The base plate 18 comprises a first end portion 22, a second end portion 24, and a central portion 26 situated between the first and second end portions 22, 24. Preferably, the base plate 18 is removably secured to a table or other similar type of support structure.

In one preferred arrangement, both the first gripper 12 and the second gripper 14 are adjustably coupled to the base plate 18. Specifically, the first gripper 12 is adjustably coupled at the first end portion 22 of the base plate 18. Similarly, the second gripper 14 is adjustably coupled at the second end portion 24 of the base plate 18. In an alternative arrangement, only one of the grippers 12, 14 may be adjustably coupled to the base plate 18, while the other gripper 12, 14 is in a fixed position with respect to the base plate 18.

In one preferred arrangement, the first gripper 12 is adjustably coupled at the first end portion 22 of the base plate 18 by way of a spring loaded assembly 28. In such an arrangement, the first and second grippers 12 and 14 can be adjusted so as to be able to move toward and away from each other, thereby changing the size of the space 16 defined between the first and second gripping portions. The adjustable nature of the first and second grippers 12 and 14 allows for the separating apparatus 10 to be used with composite parts of varying sizes and dimensions. Specifically, the adjustable nature of the first and second grippers 12 and 14 allows the separating apparatus 10 to be used with stringers having varying flange sizes.

In an exemplary embodiment, the first and second grippers 12 and 14 are provided with a plurality of holes 30 provided along a length of the grippers 12 and 14. Pins 32 of the spring loaded assembly 28 can be inserted into these holes 30 so as to secure the first and second grippers 12 and 14 in various positions along a top surface of the base plate 18. A first bridge 34 and a second bridge 36 may be provided above the first gripper 12 and the second gripper 14, respectively. The first and second bridges 34 and 36 are coupled to the base plate 18. A first pull cap 38 and a second pull cap 40 are coupled to the first bridge 34 and the second bridge 36, respectively. The pins 32 may be spring loaded, so that an operator of the separating apparatus 10 can pull the pin upwards using the pull cap, move the gripper, and release the pin, which may be biased to intend into the holes 30 of the respective gripper. One feature of such a first and second gripper arrangement is that it allows the locations of the grippers 12 and 14 to be adjusted to accommodate composite structures of different widths (i.e., J beams, I beams, and T beams having varying flange widths).

An actuation system 5 is configured to separate the layup mandrel from the composite part by applying force and prying or driving the layup mandrel away from the stationary composite part. In this manner, the composite part separates from the layup mandrel. In one preferred arrangement, the actuation system 5 comprises a central block 42. This central block 42 is coupled to the truss 20. The actuation system 5 further comprises a first actuator 44 and a second actuator 46. Both the first and second actuators 44, 46 are operatively coupled to respective hydraulic lines 66A,B and power sources 68A,B (See, FIGS. 5 and 7). The first actuator 44 further comprises a steel drive 48A, an actuator cylinder 50A, a piston 52A, and a coupler 54A. The second actuator 46 comprises similar components: a steel drive 48A, an actuator cylinder 50A, a piston 52A, and a coupler 54A.

The actuators 44 and 46 may be coupled to the respective first layup mandrel part 56 and the second layup mandrel part 58. For example, in one preferred arrangement, the mandrel parts 56 and 58 may comprise a coupling pin 90, 92 (See, e.g., FIG. 4). In such a pin coupling arrangement, the actuators 44 and 46 may be operatively coupled to the mandrel parts by way of the pins being directly coupled to the steel drives 48A, 48B, respectively. In such an arrangement, the pin is inserted into a hole defined in an end face of the layup mandrel part. For example, the first pin 90 is inserted into a hole defined in an end face of the first layup mandrel part 56. The second pin 92 is similarly situation in an end face of the second layup mandrel part 58. Preferably, the pins 90, 92 are substantially perpendicular to the actuator cylinder 50. The actuators 44 and 46 are used to generate force and may be, for example, a powered actuator, such as a hydraulic actuator. In other embodiments, the actuators 44 and 46 may comprise any type of power actuator known in the art.

Figure 4:
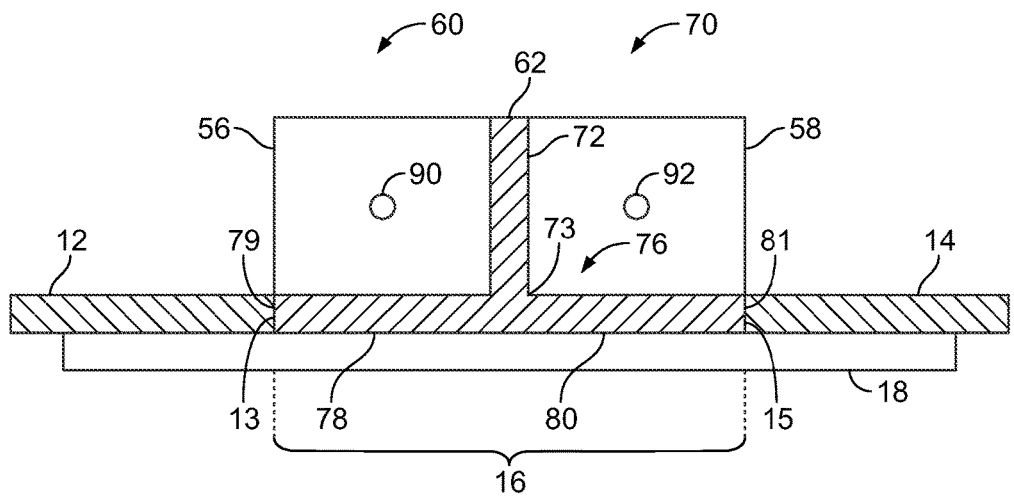
FIG. 4 is an illustration of a side view of the apparatus of FIG. 1, showing the apparatus prior to applying force to the assembly.

FIG. 4 illustrates the assembly positioned in a space 16 defined between the first gripper 12 and the second gripper 14. For ease of illustration and discussion, the actuation system 5 (FIGS. 1-3) is not illustrated in FIG. 4. As shown in FIG. 4, an assembly 60 is positioned in the space 16 between the first gripper 12 and the second gripper 14. In this illustrated arrangement, the assembly 60 comprises a layup mandrel 70 for forming a composite part 62. The layup mandrel 70 may comprise one or more mandrel layup parts. In this illustrated arrangement, the layup mandrel 70 comprises two mandrel layup parts: a first layup mandrel part 56 and a second layup mandrel part 58. As illustrated, both first and second layup mandrel parts 56, 58 are generally rectangular in configuration but alternative layup mandrel configurations may also be used.

As illustrated in FIGS. 1-3, grippers 12 and 14 each include a bearing surface configured to contact a surface of the respective layup mandrel part. Preferably, such bearing surfaces are used to keep the composite part stationary within the space 16 during the separation procedure. For example, in the illustrated arrangement of FIG. 4, the composite part 62 comprises a T-beam stringer and this T-beam stringer comprises a web 72 and a flange 76 that extends from a bottom portion 73 of the web 72. With this stringer configuration, the web 72 and flange 76 define a "T" of the T-beam stringer. While in this illustrated arrangement a "T" shaped structure is provided, the present separator apparatus 10 would also work for other types of composite structures including but not limited to I-shaped, J-shaped, and/or Z-shaped composite structures.

The illustrated "T" shaped composite structure or part 62 comprises a web 72 and a flange 76 wherein this flange 76 extends from a bottom portion 73 of this web 72. The flange 76 comprises a first flange portion 78 and a second flange portion 80. The first and second grippers 12, 14 are positioned so that they contact an end surface of these flange portions 78, 80, respectively. Specifically, the first gripper 12 is positioned so that a first gripper bearing surface 13 contacts an end surface 79 of the first flange portion 78 of the composite part 62. Similarly, the second gripper 14 is positioned so that a second gripper bearing surface 15 of the second gripper 14 contacts an outer surface 81 of the second flange 80 of the T-beam stringer. Positioning the first and second grippers 12, 14 occurs by way of the bridges 34, 36 and spring loaded assemblies 28 as previously described.

Contact between the gripper portion and flanges acts to secure the composite part 62 in place on the base plate 18. After the flange 76 is secured in place, the actuators 44, 46 are directly coupled to the first and second layup parts 56, 58. As discussed previously, the first and second actuator components may be directly coupled to a pin 90 of the first layup mandrel part 56 and a pin 92 of the second layup mandrel part. Once the actuator and layup mandrel parts are directly coupled, as the actuators 44, 46 move away from the composite part 62, this movement will cause the first and second layup parts 56, 58 to separate away from the web 72 of the composite part 62.

Figure 5:
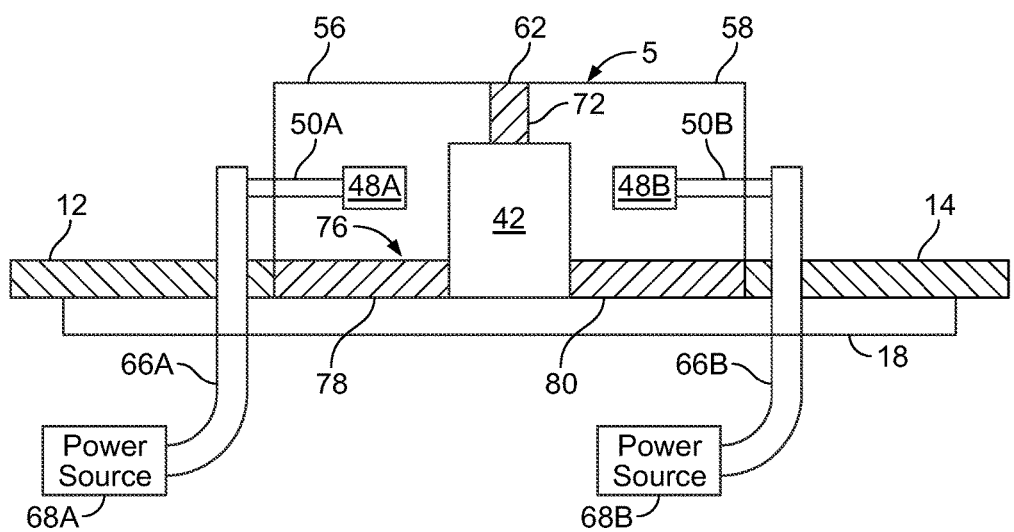
FIG. 5 is an illustration of a side view of the apparatus of FIG. 1, showing the apparatus after the actuation assembly has been coupled to the layup mandrel and prior to the activation of the actuation assembly.

For example, FIG. 5 illustrates the actuation system 5 positioned in the space 16 defined between the first gripper 12 and the second gripper 14 as illustrated in FIG. 4. As illustrated, a first steel drive 48A is mounted on the first layup mandrel part 56. Specifically, the first steel drive 48A may be connect to the first pin 90 provided on the outer surface of the first layup part 56 (See, e.g., FIG. 4). Similarly, a second steel drive 48B is mounted directly to the second layup mandrel part 58. Specifically, the second steel drive 48B may be connected to the second pin 92 provided on the outer surface of the second layup part 58. As illustrated the actuator cylinders 50A and 50B are directly coupled to the hydraulic lines 66A, 66B, respectively. These hydraulic lines are powered by way of power sources 68A, B, respectively. Now that the flange 76 of the composite part 62 has been secured between the first and second grippers 12, 14 and now that the actuation system 5 has been installed, the actuation system 5 may now be used to separate the first and second layup parts 56, 58 from the "T" beam composite part 62.

Figure 6:
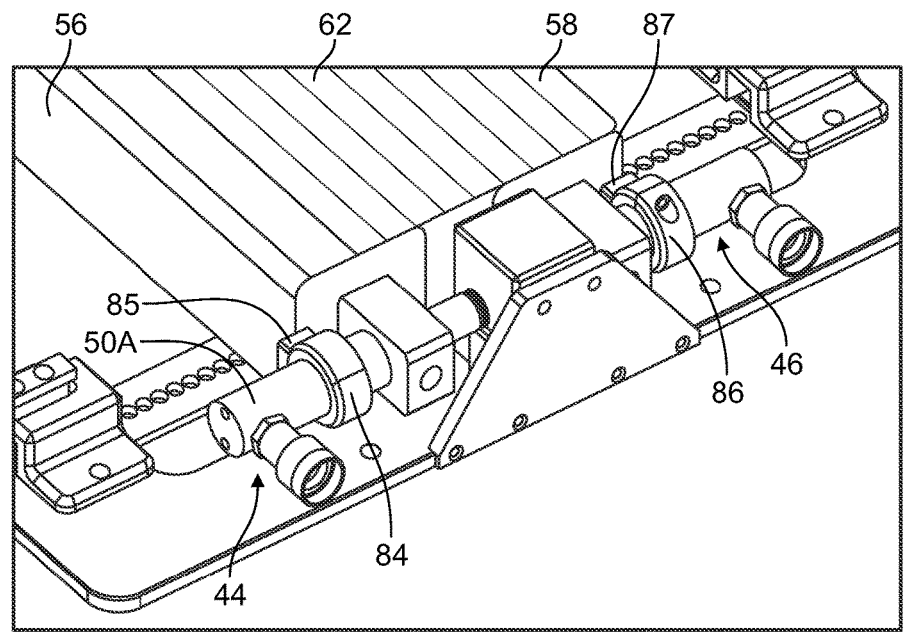
FIG. 6 is another illustration of the apparatus of FIG. 5 with the composite part positioned within the apparatus.

FIG. 6 illustrates another perspective view composite part 62 placed into the actuation system 5 as illustrated in FIG. 5. As illustrated, the first actuator 44 may comprise a first cylinder support 84. Preferably, this first cylinder support 84 is adjustable along an axis of the actuator cylinder 50A. In this manner, the cylinder support 84 may be adjusted along the axis of the actuator cylinder 50A so as to accommodate various different mandrel parts of different dimensions. The cylinder support 84 is provided with a resting foot 85 that may rest along the face of the first layup mandrel part 56. Advantageously, the resting foot 85 of the first cylinder support 84 tends to reduce tool deflection during separation. The second actuator 46 may comprise a similarly cylinder support 86 with a similar resting foot 87.

Figure 7:
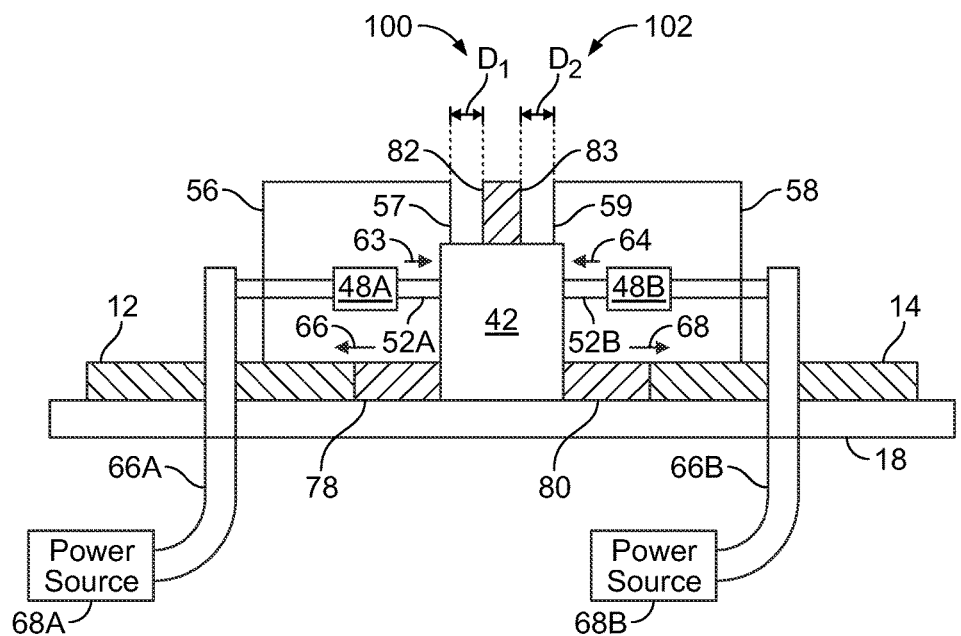
FIG. 7 is an illustration of a side view of the apparatus of FIG. 1, showing the apparatus after applying force to the assembly.

As shown in FIG. 7, during the separation procedure, the piston 52A from the first actuator 44 and the piston 52b of the second actuator 46 pushes against the transfer block 42 in the directions of arrows 63 and/or 64. The force created by the first actuator 44 acts upon the first pin 90 along with the first respective layup mandrel part 56 and drives the mandrel part 56 away from the web 72 of the composite part 62, in the direction of arrow 66. As such, a first inner surface 57 of the first layup part 56 is separated from a first web surface 82. As illustrated, the first inner surface 57 of the first layup part 56 will become separated from the first web surface 83 by a distance D1 100.

Similarly, a force created by the second actuator 46 acts upon the second pin 92 along with the second respective layup mandrel part 58 and drives the mandrel part 58 away from the web 72 of the composite part 62, in the direction of arrow 68. As such, an inner surface 59 of the second layup part 58 is separated from a second surface of the web 83. As illustrated, the first inner surface 59 of the second layup part 58 will become separated from the second surface of the web 83 by a distance D2 102.

In one preferred arrangement, only one layup mandrel part may be separated from the composite part 62 at a time. For example, during separation, only the first layup mandrel part 56 may be separated from the composite part 62. Alternatively, both the first and second layup mandrel parts 56, 58 may be separated from the composite part simultaneously or near simultaneously.

During use of the separating apparatus 10 to separating a layup mandrel 70 from a composite part 62, the composite part 62 is constrained in a stationary position. In a particular embodiment, a position of a first gripper 12 is adjusted so as to change a size of a space 16 in which the assembly is positioned. Further, in some embodiments, at least the first gripper 12 constrains the composite part 62 in the stationary position. An actuator 44, 46 is coupled to the layup mandrel 70, and a force is applied to the transfer block 42. The actuator 44, 46 comprises a piston 52A,B, which moves in a first direction 63,64 to contact the transfer block 42. The application of force causes the layup mandrel 70 to move in a second, opposite direction 66, 68 away from the composite part 62. When the layup mandrel 70 comprises a first layup mandrel part 56 and a second layup mandrel part 58, the first actuator 44 is coupled to the first layup mandrel 56 and a second actuator 46 is coupled to the second layup mandrel 58. The method includes separating the first layup mandrel part 56 and the second layup mandrel part 58 from the composite part 62 simultaneously. Alternatively, the method includes separating the first layup mandrel part 56 from the composite part 62 before the second layup mandrel part 58 is separated from the composite part 62.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. An apparatus for applying a force to an assembly comprising a layup mandrel and a composite part, the apparatus comprising:
    a first gripper;
    a second gripper, wherein the second gripper is spaced apart from the first gripper to define a space between the first and second grippers, the space configured to receive the assembly; and
    an actuation system positioned between the first and second grippers adjacent the space, the actuation system comprising at least a first actuator, the actuation system configured to separate the layup mandrel from the composite part by applying force, wherein the first actuator is operatively coupled to an adjacent mandrel.

2. The apparatus of claim 1,
    further comprising a body comprising a central portion, a first end portion, and a second end portion,
    wherein the first gripper is located at the first end portion,
    wherein the second gripper is located at the second end portion, and
    wherein the actuation system is coupled to the central portion.

3. The apparatus of claim 1, wherein a position of the first gripper is adjustable.

4. The apparatus of claim 1, wherein a position of the second gripper is adjustable.

5. The apparatus of claim 1, wherein at least the first gripper comprises a plurality of holes, wherein a pin is configured to be inserted into one of the plurality of holes so as to secure the first gripper in a desired position.

6. The apparatus of claim 5, wherein the pin comprises a spring loaded pin.

7. The apparatus of claim 1, wherein the first gripper comprises a bearing surface configured to contact a surface of an assembly positioned in the space.

8. The apparatus of claim 1 wherein the first actuator comprises a first hydraulic actuator.

9. The apparatus of claim 8, wherein the actuation system comprises a second hydraulic actuator.

10. The apparatus of claim 9, wherein the actuation system further comprises a transfer block positioned between the first and the second hydraulic actuators.

11. The apparatus of claim 10, wherein the transfer block is configured to receive a force provided by at least the first hydraulic actuator so as to separate the layup mandrel from the composite part.

12. The apparatus of claim 1, wherein the first actuator is operatively coupled to the adjacent mandrel using a pin.

13. A method of separating a layup mandrel from a composite part using an apparatus for applying a force to an assembly comprising the layup mandrel and the composite part, the apparatus comprising: a first gripper; a second gripper, wherein the second gripper is spaced apart from the first gripper to define a space between the first and second grippers, the space configured to receive the assembly; and an actuation system positioned between the first and second grippers adjacent the space, the actuation system comprising at least a first actuator, the actuation system configured to separate the layup mandrel from the composite part by applying force, wherein the first actuator is operatively coupled to an adjacent mandrel, the method comprising:
    constraining the composite part in a stationary position;
    coupling the first actuator to the layup mandrel; and
    applying force to a transfer block, wherein the first actuator comprises a piston, which moves in a first direction to contact the transfer block,
    whereby the layup mandrel is caused to move in a second, opposite direction away from the composite part.

14. The method of claim 13, wherein the layup mandrel comprises
    a first layup mandrel part and a second layup mandrel part, the method further comprising the step of
    coupling the first actuator to the first layup mandrel and a second actuator to the second layup mandrel.

15. The method of claim 13, wherein the first layup mandrel and the second layup mandrel are separated from the composite part simultaneously.

16. The method of claim 13, wherein the first layup mandrel is separated from the composite part before the second layup mandrel is separated from the composite part.

17. The method of claim 13, further comprising the step of hydraulically actuating the first actuator.

18. The method of claim 13, further comprising the step of
    adjusting a position of a first gripper so as to change a size of a space.

19. The method of claim 18, wherein at least the first gripper constrains the composite part in the stationary position.

20. The apparatus of claim 3, wherein the second gripper is in a fixed position.

* * * * *